United States Patent [19]
Ohtomo et al.

[11] Patent Number: 5,745,623
[45] Date of Patent: Apr. 28, 1998

[54] LASER SYSTEM FOR SURVEYING

[75] Inventors: Fumio Ohtomo; Hiroshi Koizumi; Masayuki Momiuchi; Masahiro Ohishi; Yoshiaki Goto, all of Tokyo-to, Japan

[73] Assignee: Kabushiki Kaisha TOPCON, Tokyo, Japan

[21] Appl. No.: 691,548

[22] Filed: Aug. 2, 1996

[30] Foreign Application Priority Data

Aug. 17, 1995 [JP] Japan .................... 7-231925
May 21, 1996 [JP] Japan .................... 8-149824
Jun. 19, 1996 [JP] Japan .................... 8-178510

[51] Int. Cl.⁶ .................................... G02B 6/26
[52] U.S. Cl. ................... 385/88; 385/93; 385/33; 385/36
[58] Field of Search ................ 385/88–94, 901, 385/33, 34, 31, 36

[56] References Cited

U.S. PATENT DOCUMENTS

| | | | |
|---|---|---|---|
| 4,615,031 | 9/1986 | Eales et al. | 350/96.2 |
| 4,633,170 | 12/1986 | Burns | 350/96.15 |
| 5,222,170 | 6/1993 | Bargar et al. | 385/88 |

Primary Examiner—John Ngo
Attorney, Agent, or Firm—Nields, Lemack & Dingman

[57] ABSTRACT

A laser system for surveying, which comprises a laser light source unit, an optical system for irradiating a laser beam from the laser light source unit toward a given direction, whereby said laser light source unit is at least thermally isolated from the optical system, and the laser beam from the laser light source unit is guided toward the optical system by an optical fiber. Because the laser light source unit, or at least a heat generating portion of the light source unit is isolated from the optical system, no influence of heat from the laser light source unit is exerted on the optical system, and it is possible to prevent decrease of accuracy due to heat and to maintain the laser system for surveying in a condition to provide measurement at high accuracy.

15 Claims, 9 Drawing Sheets

LASER SYSTEM FOR SURVEYING

BACKGROUND OF THE INVENTION

The present invention relates to a laser system for surveying with a laser incorporated in it, and in particular, to a laser system for surveying, taking influence of heat from the laser into account.

As the laser system for surveying with a laser incorporated in it, various type of laser systems are known such as a rotating laser used in theodolite or interior finish work of buildings, a pipe laser used in piping work, a laser range finder used in measurement of distance, leveling instrument, etc. He—Ne laser and LD (laser diode) are used as the laser light source.

In general, an optical system for leveling or an optical system for range finding in such laser systems for surveying are arranged in a body tube (lens barrel), which is rotatably supported in vertical and horizontal directions in a casing. The laser light source is fixed on the body tube and is integrated with the optical system.

In case He—Ne laser is used as the laser light source, He—Ne tube is large in shape and cannot be designed in compact form. Further, when He—Ne tube is used, a high voltage is required for laser oscillation, and a power source of 100 V is generally used. For this reason, a power consumption is high and a heating value is also high. Accordingly, the power source cannot be incorporated in the system, and it is difficult to design a compact, portable and small-size system.

When the optical system is heated by the heat from the laser light source, detection accuracy of various types of instruments such as a tilt sensor decreases. Or, when a body tube, mechanisms supporting the body tube, etc. are heated, displacement occurs due to thermal expansion, and mechanical accuracy is decreased. For this reason, it is necessary to provide a cooling mechanism and a heat radiating mechanism, and this leads to more complicated and large-scale system.

LD (laser diode) as described above is small in size and low in power consumption, and it is easily incorporated in the body tube, and small-sized portable system can be designed. FIG. 14 schematically shows a pipe laser, which is an example of a laser system for surveying using LD.

An optical system 1 is installed in a body tube 2, which is rotatably supported in vertical and horizontal directions in a casing 4, and a laser light source 3 is fixed on the base of the body tube 2. Laser beam 6 emitted from LD is in an elliptical shape with axes of different lengths. Because a spread angle is large, a collimator lens 5 is arranged to turn the laser beam to parallel beams. Normally, a compensating lens is mounted to turn the elliptical shape to a shape closer to circular.

Compared with the laser beam from He—Ne tube, the laser beams 6 from LD are not uniform parallel laser beams with a distinct contour, but the beams are spread, and even when the shape of the beams is compensated, the beams are difficult to recognize visually. To improve visual recognizability, an output can be increased, whereas there is legal restriction on intensity of laser beam from the viewpoint of protection of the workers. Therefore, to improve visual recognizability with the same output, it is necessary to select a wavelength, which is easily recognizable. Green color is easily recognized, but semiconductor element to emit high output a green laser beam is not manufactured by mass production. In this respect, a resonator is provided at the laser light source from near infrared LD and a frequency of the laser beam is increased to convert to green color.

As the laser source to emit a green laser beam, LD pumped solid laser is known, which combines oscillator of external or internal resonance type SHG (second harmonic generation) by near infrared semiconductor light emitting element. FIG. 15 is a schematical drawing of a laser source 3, which is LD pumped solid-state laser using such internal resonance type SHG system.

In FIG. 15, reference numeral 8 represents a light emitting unit, and 9 represents an optical resonator. The light emitting unit 8 comprises an LD light emitter 10 and a condenser lens 11. Further, the optical resonator 9 comprises a laser crystal (Nd:YVO$_4$) plate 13 having a first dielectric reflection film 12 on it, a nonlinear optical medium (KTP) 14, and an output mirror 16 having a second dielectric reflection film 15 on it. In the optical resonator 9, a laser beam is pumped, resonated, amplified and outputted. It is described in more detail as follows:

The laser light source 3 is to generate a laser beam, and the LD light emitter 10, i.e. semiconductor laser, is used. This LD light emitter 10 has a function as a excitation light generator to generate fundamental wave. The laser light source 3 is not limited to semiconductor laser, but any light source means may be adopted if it can generate laser beam.

Laser crystal plate 13 is to amplify light. As the laser crystal plate 13, YAG (yttrium aluminum garnet) doped with Nd$^{3+}$ ion is used. YAG has oscillation lines at 946 nm, 1064 nm, 1319 nm, etc.

The laser crystal plate 13 is not limited to YAG, but (Nd:YVO$_4$) having an oscillation line at 1064 nm or (Ti:Sapphire) having an oscillation line at 700 to 900 nm may be used.

On the side of the laser crystal plate 13 closer to the LD light emitter 10, a first dielectric reflection film 12 is formed. This first dielectric reflection film 12 is highly transmitting to the LD light emitter 10 and is highly reflective to an oscillation wavelength of the laser crystal plate 13. It is also highly reflective to SHG (second harmonic generation).

The output mirror 16 is placed at face-to-face position to the laser crystal plate 13. The side of the output mirror 16 closer to the laser crystal plate 13 is fabricated in form of a concave spherical mirror having an adequate radius, and a second dielectric reflection film 15 is formed on it. The second dielectric reflection film 15 is highly reflective to an oscillation wavelength of the laser crystal plate 13 and is highly transmitting to SHG (second harmonic generation).

As described above, when the first dielectric reflection film 12 of the laser crystal plate 13 is combined with the output mirror 16 and the light beam coming from the LD light emitter 10 is pumped to the laser crystal plate 13 via the condenser lens 11, a light is reciprocally irradiated between the first dielectric reflection mirror 12 of the laser crystal plate 13 and the output mirror 16, and the light can be trapped for long time. Thus, the light can be resonated and amplified.

In the optical resonator comprising the first dielectric reflection film 12 of the laser crystal plate 13 and the output mirror 16, the nonlinear optical medium 14 is placed.

Here, brief description will be given on a nonlinear optical effect.

When an electric field is applied on a substance, electric polarization occurs. When the electric field is small, the polarization is proportional to the electric field. However, in case of a strong coherent light such as a laser beam, proportional relationship between the electric field and the polarization breaks down, and nonlinear polarization component proportional to the square or the cube of the electric field becomes prominent.

Therefore, in the nonlinear optical medium 14, a component proportional to square of a lightwave electric field is contained in the polarization generated by the light wave. By nonlinear polarization, a coupling occurs between lightwaves having different frequencies, and a higher harmonic wave to double the light frequency is generated. This secondary higher harmonic wave generation (SHG) is called second harmonic generation.

In the laser light source 3 as described above, the nonlinear optical medium 14 is placed in the optical resonator, which comprises the laser crystal plate 13 and the output mirror 16, and it is called internal type SHG. Because a converted output is proportional to the square of fundamental wave opto-electric power, a high light intensity in the optical resonator can be directly utilized.

As the nonlinear optical medium 14, KTP (KTiOPO$_4$; titanyl potassium phosphate), BBO ($\beta$-BaB$_2$O$_4$; $\beta$-lithium borate), LBO (LiB$_3$O$_5$; lithium triborate), etc. are used. Primarily, it is converted from 1064 nm to 532 nm.

KNbO$_3$ (potassium niobate) and the like are also adopted, and it is primarily converted from 946 nm to 473 nm.

In general, to stabilize an output wavelength of the laser light source, an output laser beam is monitored and it is fed back to the laser source. FIG. 16 is a block diagram of feedback of an oscillator of internal resonance type SHG mode. A light source unit 60 comprises a laser light source 3, a half-mirror 61 and a condenser lens 17.

A part of the laser beam outputted from the laser light source 3 is split by the half-mirror 61 as a monitor beam. After passing through the half-mirror 61, the laser beam advances toward the condenser lens 17. The monitor beam is received by a monitor photodetector 62 and a photodetection circuit 63 and is converted to an electric signal. A photodetection signal from the photodetection circuit 63 is inputted to a control unit 66, which outputs a control signal corresponding to the photodetection signal to an LD drive unit 67. The LD drive unit 67 controls light emission of the LD light emitter 10 based on the control signal.

In the LD excitation solid laser combined with the oscillator of internal resonance type SHG mode as described above, efficiency is lower than a single semiconductor laser element, and heat is generated more. Accordingly, when the LD pumped solid-state laser is mounted on a casing where an optical system such as telescope is accommodated, accuracy is decreased due to thermal expansion or thermal displacement as in the case of laser light source of He—Ne tube system.

SUMMARY OF THE INVENTION

It is an object of the present invention to provide a laser system for surveying having high accuracy, by which it is possible to use a laser beam highly recognizable and to eliminate an influence of the heat from the laser light source.

It is another object of the present invention to provide a laser system for surveying, by which it is possible to install a laser light source and an optical system at separate positions, to eliminate thermal influence from the laser source, to facilitate adjustment of connection of the laser source with a optical fiber when the laser source and optical system are connected by the optical fiber, and to make it possible to connect the optical fiber causing no disorder after the adjustment and with fewer change over time.

The present invention provides a laser system for surveying, which comprises a laser light source unit, an optical system for irradiating a laser beam from the laser light source unit toward a given direction, and an optical fiber for guiding the laser beam from the laser light source unit toward the optical system, whereby the laser light source unit is at least thermally isolated from the optical system; or the present invention provides a laser system, wherein the laser light source unit is an LD pumped solid-state laser comprising a light emitting unit and an optical resonator, and the optical resonator is provided in the optical system, and the light emitting unit is thermally isolated; or a laser system, wherein at least a heat generating portion of the laser light source unit is fixed on a casing, and heat is radiated via the casing; or a laser system, wherein the optical fiber is a constant polarization optical fiber for sending a light while maintaining a direction of polarization; or a laser system, wherein there are provided a first reflecting means arranged near an optical fiber output end and for reflecting the laser beam and for splitting a part of the laser beam as a monitor beam, and a first light receiving means for receiving the monitor beam split by the first reflecting means; or a laser system, wherein the first reflecting means is a polarized light mirror; or a laser system, wherein a laser output of the laser light source unit is controlled according to the light receiving amount of the first light receiving means; or a laser system, wherein there are provided a second reflecting means for splitting a laser beam near an optical fiber input end and a second light receiving means; or the present invention provides a laser system for surveying, wherein the laser light source unit comprises a semiconductor laser light source and a casing for accommodating the semiconductor laser light source, and the casing and the optical fiber are connected via a connection adjusting means having a spherical surface; or a laser system, wherein the laser light source unit comprises an optical resonator using a semiconductor laser as a light source for excitation and a casing for accommodating the optical resonator, and the casing and the optical fiber are connected via a connection adjusting means having a spherical surface; or a laser system, wherein a laser beam incident end of the optical fiber is movable in a direction perpendicular to an optical axis and is supported tiltably and displaceably in axial direction; or a laser system, comprising a laser beam emitting hole formed on the casing, a cylindrical holder mounted on the laser beam emitting hole, and a ball joint held by the holder and at least a part thereof is in spherical form, and the ball joint holds the laser beam incident end of the optical fiber; or a laser system, wherein the laser beam incident end of the optical fiber is twistably supported with respect to optical axis; or a laser system, wherein the ball joint holds a GRIN lens together with the laser beam incident end.

DETAILED DESCRIPTION OF THE PREFERRED EMBODIMENTS

Figure 1:
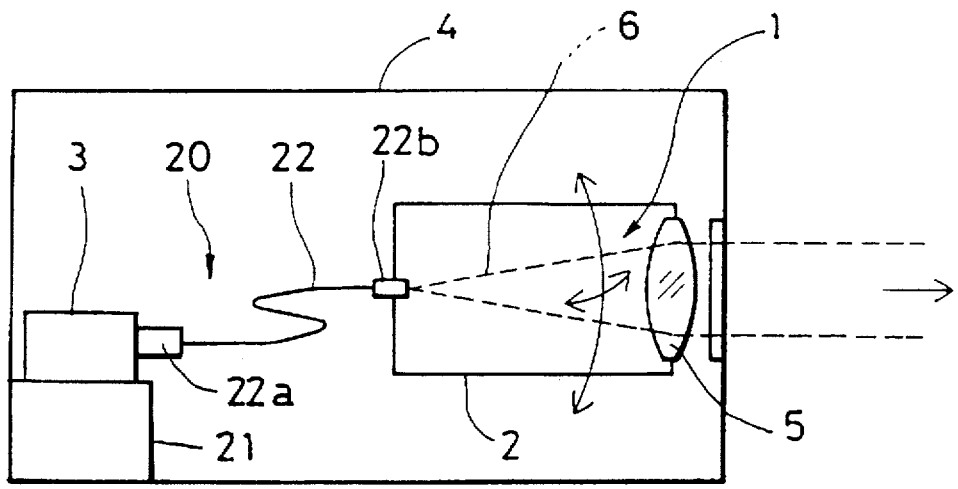
FIG. 1 is a schematical block diagram of an embodiment of the present invention.

In the following, description will be given on embodiments of the present invention referring to the drawings.

Figure 2:
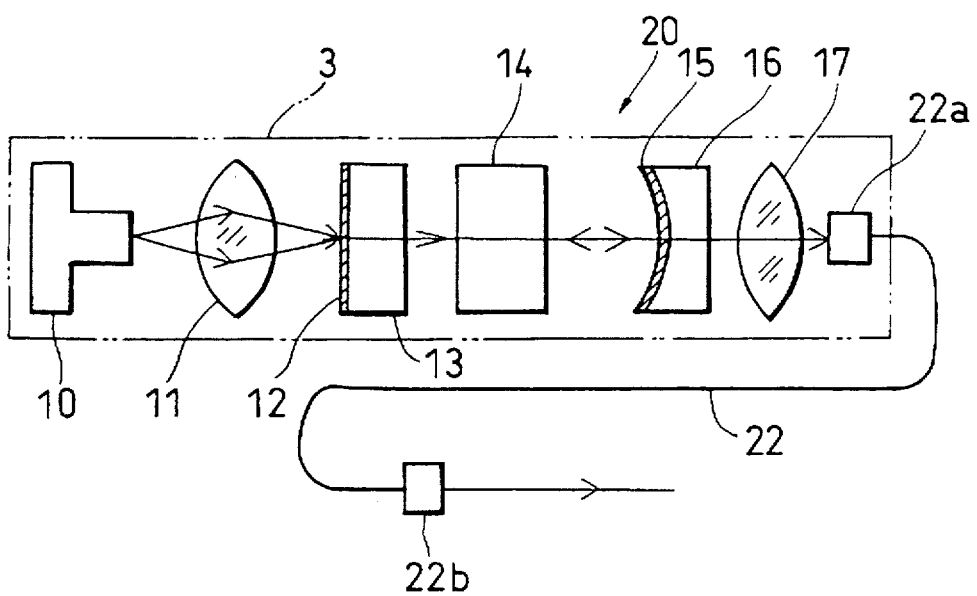
FIG. 2 is a schematical drawing of a light source unit used in the above embodiment.
Figure 14:
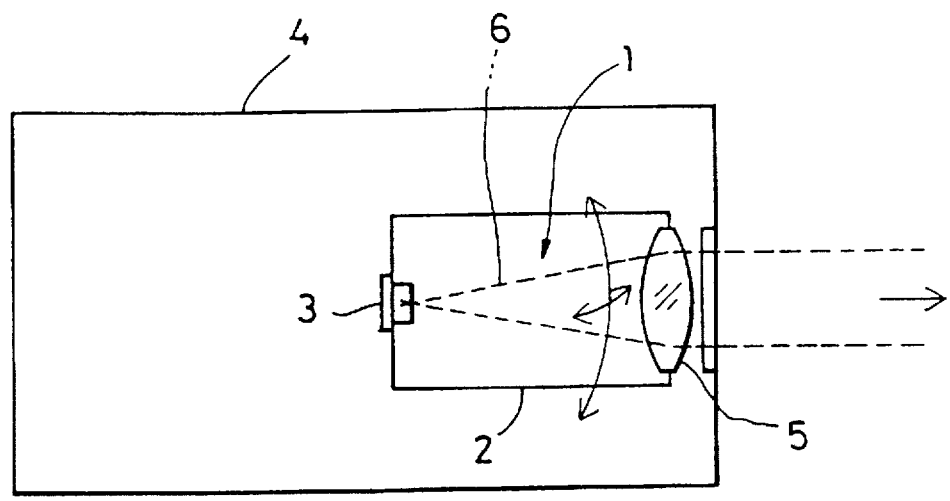
FIG. 14 is a schematical drawing of an arrangement of a conventional type system.
Figure 15:
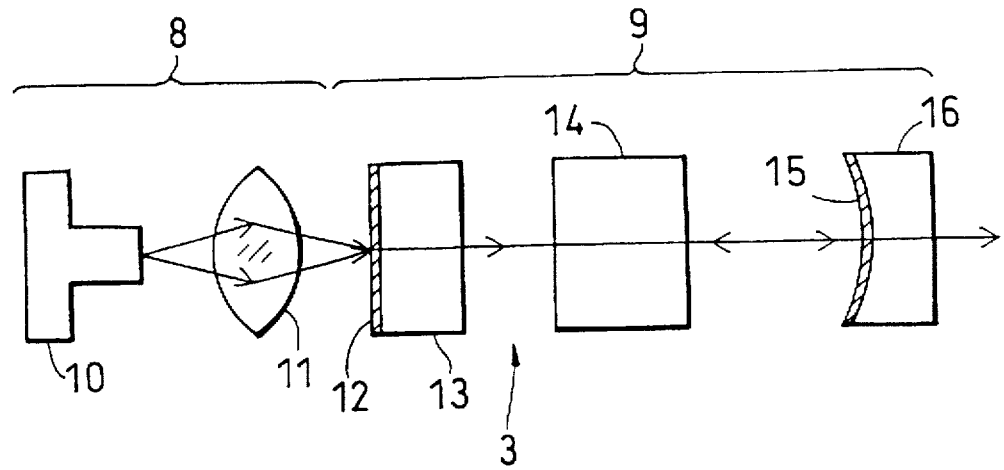
FIG. 15 shows an arrangement of the laser light source unit of the conventional type system.
Figure 16:
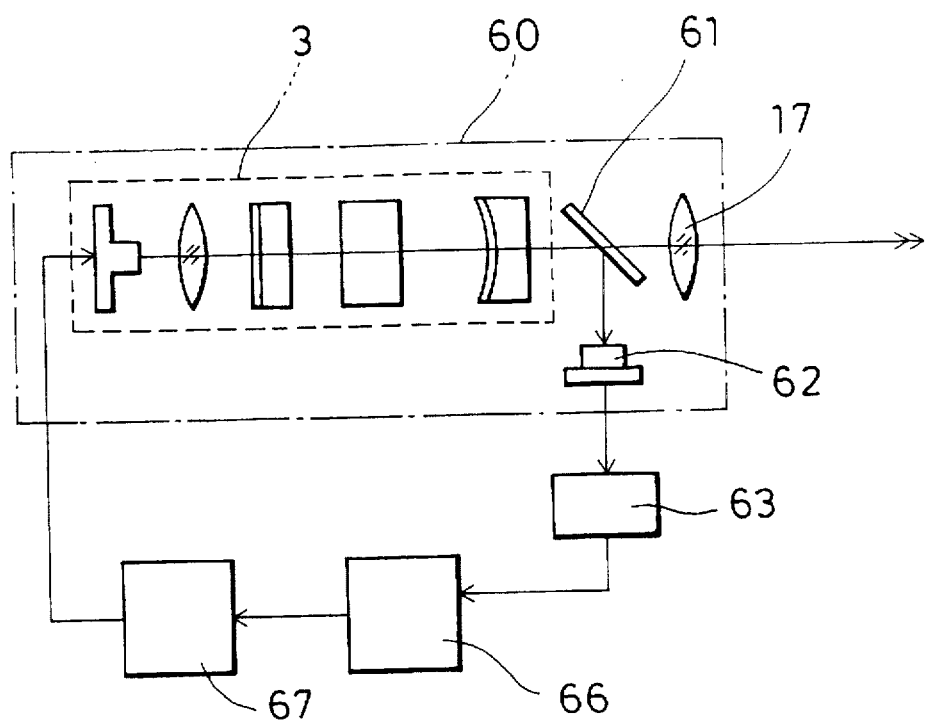
FIG. 16 is a control block diagram of a light source unit of the conventional type system.

FIG. 1 schematically shows an embodiment of the present invention, and FIG. 2 represents a light source unit 20 used in the embodiment of the invention. In FIG. 1, the same component as in FIG. 14 is referred by the same symbol. In FIG. 2, the same component as shown in FIG. 15 is referred by the same symbol.

An optical system 1 is arranged in a body tube 2, which is rotatably supported in vertical and horizontal directions in a casing 4. An optical fiber 22 for guiding a laser beam from a laser light source 3 is fixed on a base of the body tube 2, and a collimator lens 5 is mounted at the forward end of the body tube 2.

At a suitable position in the casing 4, e.g. at a position separate from the body tube 2 for passing the laser beam 6 or from supporting mechanisms of the body tube 2, for instance, at a rear portion of the casing 4, a heat sink 21 is fixed by closely fitting it to the rear wall surface and bottom surface of the casing 4.

The light source unit 20 comprises the laser light source 3 and an optical fiber 22 for guiding the laser beam from the laser light source 3 toward a given position. The laser light source 3 is fixed on the heat sink 21 by reducing thermal resistance, and a laser beam incident end 22a of the optical fiber 22 is fixed at a laser beam emitting position of the laser light source 3 via a condenser lens 17. A laser beam emitting end 22b is fixed at a base end of the body tube 2 along optical axis of the laser beam 6, and the laser beam from the laser light source 3 is guided toward the optical system 1.

The laser beam 6 emitted from the laser beam emitting end 22b of the optical fiber 22 is turned to parallel beams by the collimator lens 5 and is irradiated from the casing 4.

As described above, the laser light source 3, which generates heat, is fixed on the heat sink 21, and the heat from the laser light source 3 is radiated out of the casing 4 via the heat sink 21. Thus, temperature increase within the casing 4 can be suppressed, and because the heat sink 21 is separated from the body tube 2 and from the supporting mechanisms of the body tube 2, heat from the light source unit 20 does not exert influence on accuracy of the system.

Figure 3:
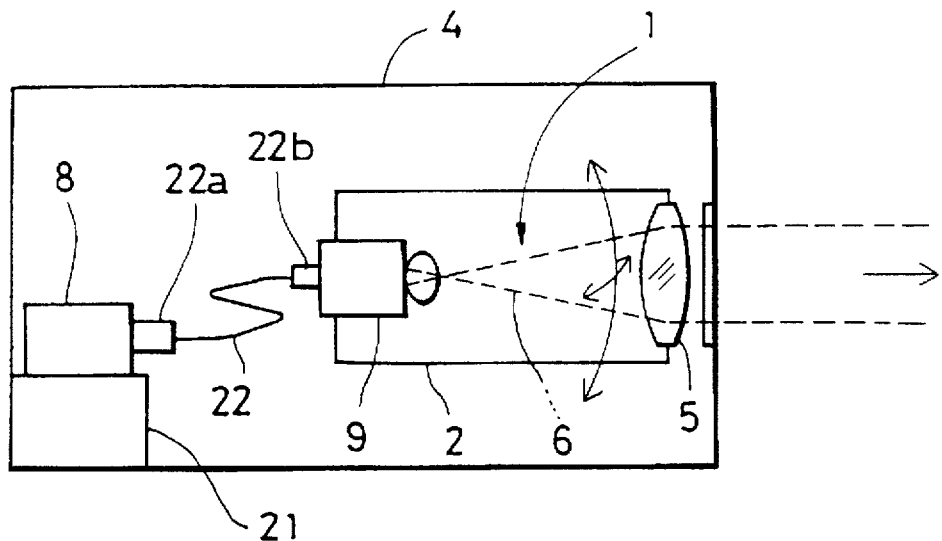
FIG. 3 is a schematical drawing of an arrangement of another embodiment of the present invention.
Figure 4:
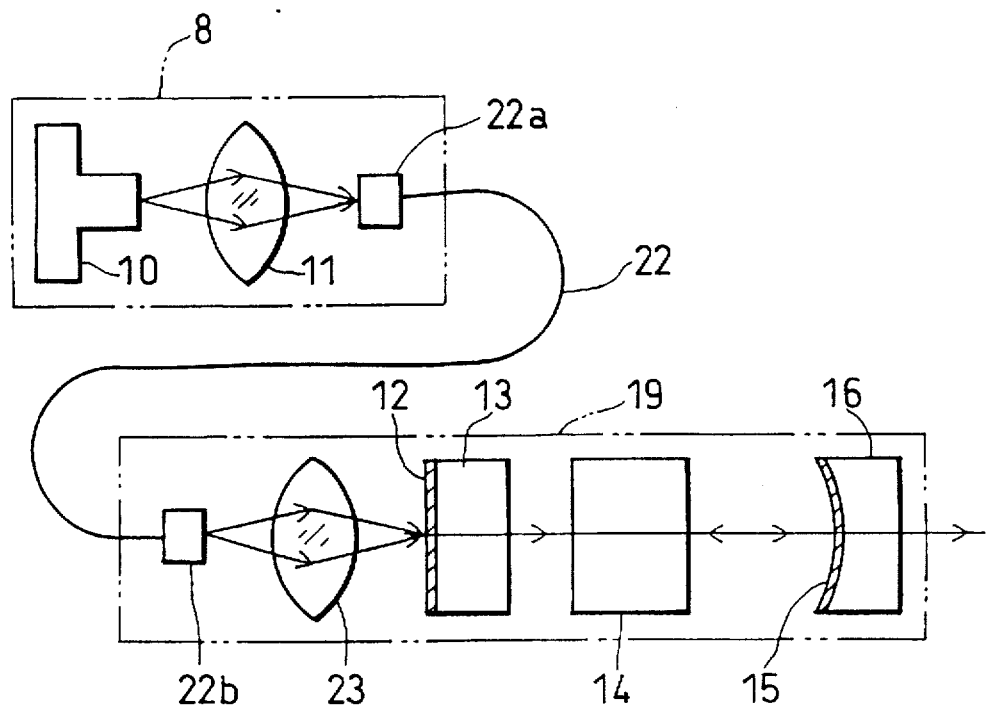
FIG. 4 is a drawing of an arrangement of a light source unit used in the above embodiment.

Next, FIG. 3 and FIG. 4 each represents another embodiment of the present invention. Taking notice of the fact that a heat generating portion of the light source unit 20 is an LD light emitter 10, the light emitting unit 8 and the optical resonator 9 are separated from each other, and the light emitting unit 8 and the optical resonator 9 are connected via the optical fiber 22.

The light emitting unit 8 comprises an LD light emitter 10 and a condenser lens 11. Further, the optical resonator 9 comprises a condenser lens 23, a laser crystal (Nd:YVO$_4$) plate 13 having a first dielectric reflection film 12 formed on it, a nonlinear optical medium (KTP) 14, and an output mirror 16 having a second dielectric reflection film 15 formed on it.

The light emitting unit 8 is fixed on the heat sink 21 by reducing thermal resistance, and the optical resonator 9 is mounted on a base end of the body tube 2. The laser beam incident end 22a of the optical fiber 22 is arranged at an image forming point of the condenser lens 11, and the laser beam emitting end 22b is placed on optical axis of the condenser lens 23. The laser beam emitted from the laser beam emitting end 22b of the optical fiber 22 forms an image in the laser crystal (Nd:YVO$_4$) plate 13 by the condenser lens 23. The laser beam is pumped between the laser crystal plate 13 and the output mirror 16, resonated, amplified and outputted. The laser beam 6 coming from the optical resonator 9 is turned to parallel beams by the collimator lens 5 and is irradiated out of the casing 4.

In this embodiment again, the light emitting unit 8, which generates heat, is fixed on the heat sink 21, and the heat from the light emitting unit 8 is radiated out of the casing 4 via the heat sink 21. As a result, temperature increase within the casing 4 can be suppressed, and because the heat sink 21 is separated from the body tube 2 and from the supporting mechanisms of the body tube 2, heat of the light emitting unit 8, i.e. the light source unit 20, does not exert influence on accuracy of the system.

Figure 5:
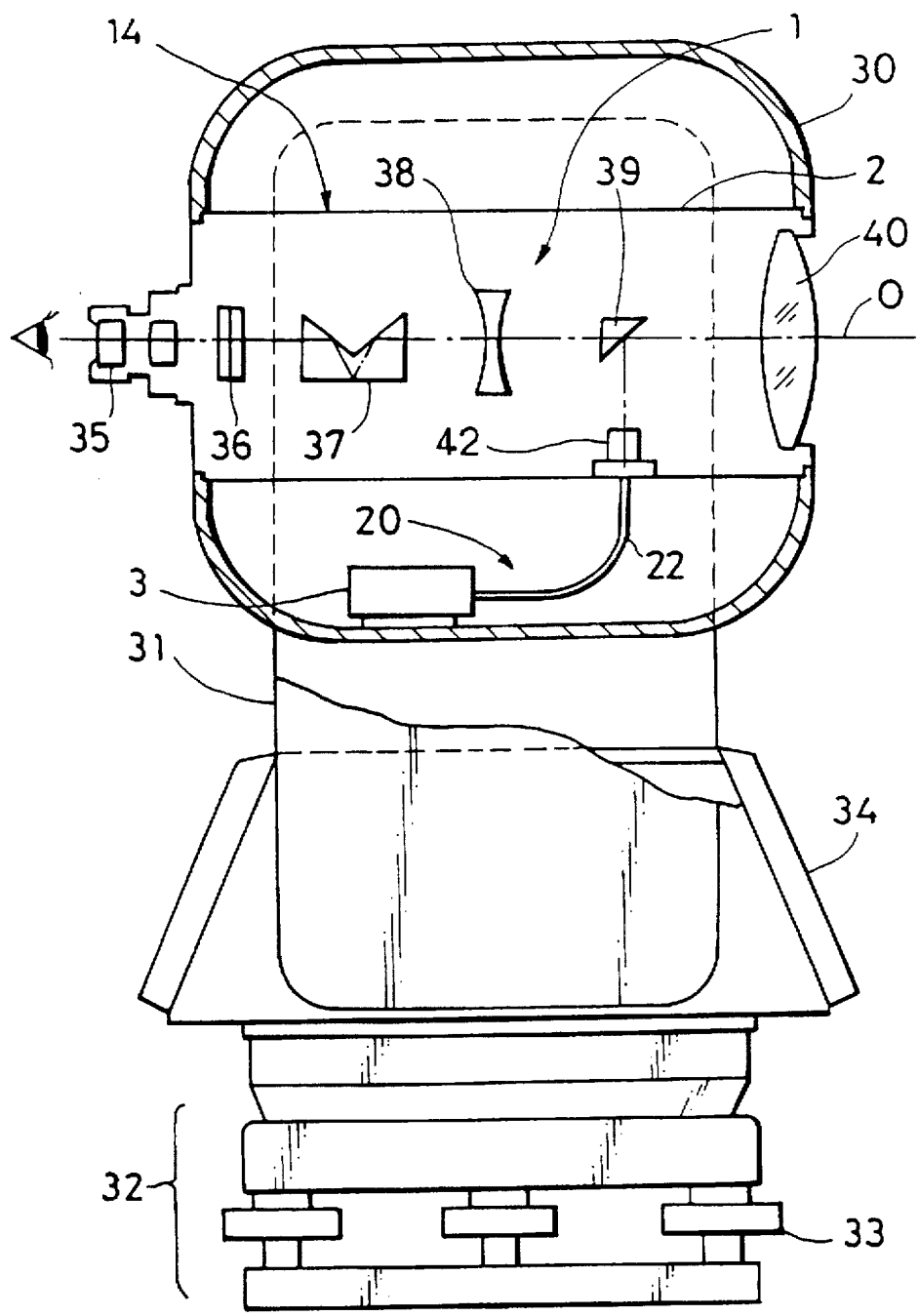
FIG. 5 is a cross-sectional view of an embodiment of the present invention.

FIG. 5 shows a case where the present invention is applied on a theodolite.

In the figure, the component having the same arrangement as shown in FIG. 1 and FIG. 3 is referred by the same symbol.

A casing 30 is tiltably supported on a rack 31, which is rotatable around the vertical axis, so that the casing 30 can be tilted in vertical direction. The rack 31 is placed on a leveling stand 32, and the casing 30 can be kept at a horizontal position by adjusting leveling screws of the leveling stand 32. A display unit 34 is arranged on the leveling stand 32, and data such as a horizontal angle, an elevation angle, a distance, etc. are displayed on the display unit 34.

A telescope 14 is installed in a horizontal direction on the casing 30, and an optical system 1 having an optical axis in a horizontal direction is accommodated in the body tube 2 of the telescope 41. The optical system 1 comprises an ocular lens 35, a reticle 36, a prism 37 for turning the image to an erect image, an internal lens 38, a laser reflection mirror 39 for selectively reflecting a green laser beam, an objective lens 40, etc. are arranged in this order along the optical axis O.

The laser light source 3 is fixed on a base of the casing 30, and a laser beam emitting unit 42 is fixed at a position on the body tube 2 opposite to the laser reflection mirror 39. The laser beam emitting end 22b of the optical fiber 22 is fixed and held on the laser beam emitting unit 42. The casing 30 is made of a synthetic resin material having high thermal conductivity and containing carbon. Or, at least a portion thereof where the laser light source 3 is fixed is made of a material having high thermal conductivity, or of a synthetic resin material having high thermal conductivity and containing carbon or metal such as copper, aluminum, etc.

The laser reflection mirror 39 selectively reflects a green laser beam as described above and allows a light beam of other wavelength to pass. The laser beam emitted from the laser beam emitting unit 42 is reflected by the laser reflection mirror 39 and is irradiated toward an object (not shown) from the objective lens 40. An irradiating position of the laser beam can be confirmed by the optical system 1.

The laser light source 3, which generates heat, of the light source unit 20 is fixed on the casing 30, and heat from the laser light source 3 is radiated from the casing 30. Thus, heat is not retained within the casing 30 and temperature rise can be suppressed. Further, heat from the laser light source 3 is not transmitted to the body tube 2 because the laser beam from the laser light source 3 is guided by the optical fiber 22. Because the optical system 1 or mechanisms supporting the optical system 1 are kept out of influence of the heat, it is possible to measure at high accuracy.

Figure 6:
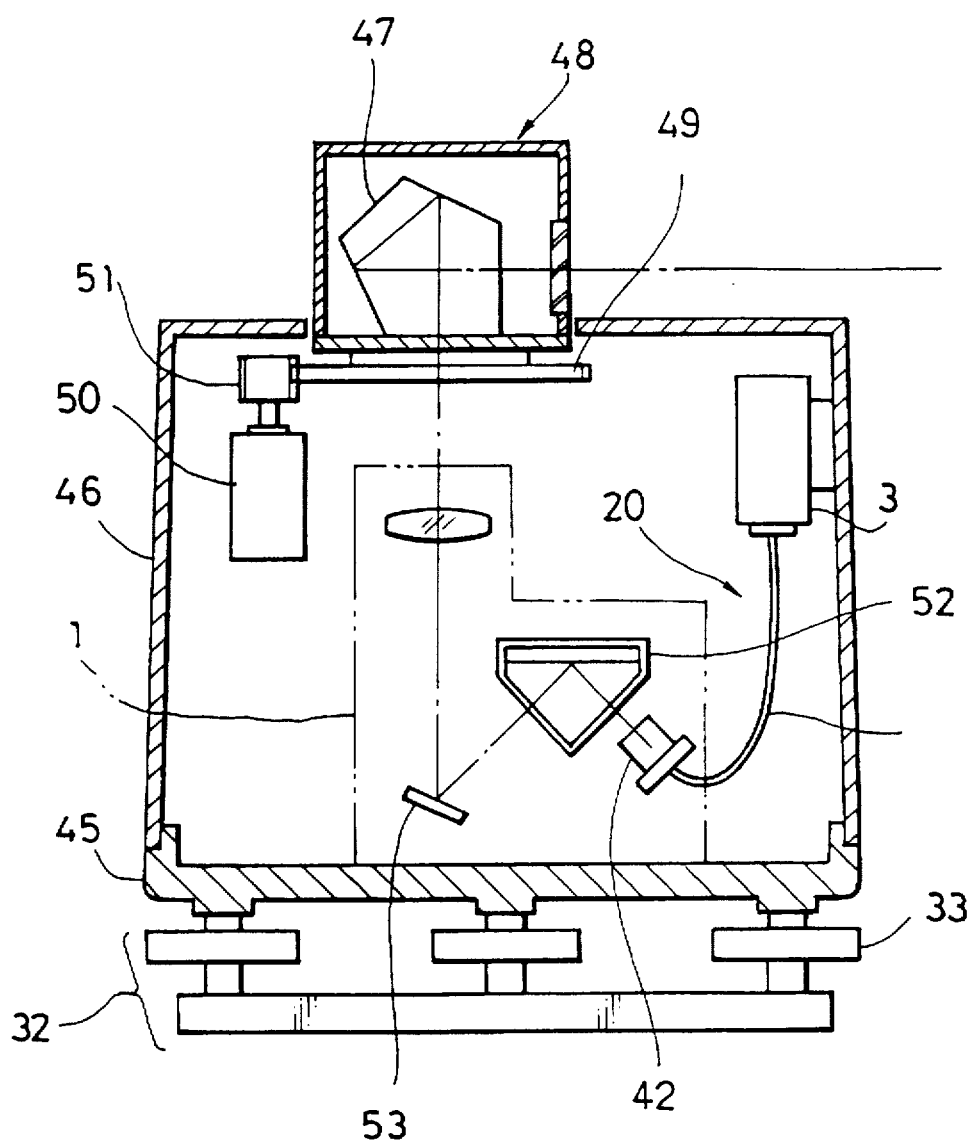
FIG. 6 is a cross-sectional view of another embodiment of the present invention.

FIG. 6 represents a case where the present invention is applied to a rotary laser irradiating device.

In the figure, the component having the same arrangement as shown in FIG. 1, FIG. 3 and FIG. 5 is referred by the same symbol.

On a main unit base 45, which constitutes a part of a leveling stand 32, a casing 46 is mounted, and an optical system 1 and a light source unit 20 are installed in the casing 46. On top of the casing 46, a rotating unit 48 for accommodating a pentagonal prism 47 is rotatably mounted. The casing 46 is made of a metal of high thermal conductivity such as copper, aluminum, iron, etc., or of a synthetic resin material of high thermal conductivity by combining carbon etc. A driven scanning gear 49 on the rotating unit 48 is engaged with a driving gear 51 on an output shaft of a scanning motor 50. When driven by the scanning motor 50, the pentagonal prism 47 is rotated around an optical axis of the optical system 1 via the driving gear 51 and the driven scanning gear 49.

The laser light source 3 of the light source unit 20 is fixed on a side wall of the casing 46, and heat from the laser light source 3 is radiated to outside via the casing 46. The laser beam coming from the laser light source 3 is guided toward the optical system 1 via the optical fiber 22.

The optical system 1 comprises a tilt compensation device 52 having a free liquid surface and a reflection mirror 53. A laser beam emitting unit 42 for fixing and holding the laser beam emitting end 22b is arranged in such manner that the laser beam is irradiated toward the free liquid surface of the tilt compensating device 52, and the reflection mirror 53 is placed in such manner that the laser beam reflected by the tilt compensating device 52 is reflected toward the pentagonal prism 47.

Upon entering the optical system 1 from the laser beam emitting unit 42, the laser beam is deflected toward a horizontal direction by the pentagonal prism 47 and irradiated so that a horizontal reference plane by the laser beam is formed by rotation of the pentagonal prism 47.

In this embodiment again, the laser light source 3, which generates heat in the light source unit 20, is fixed on the casing 46. Thus, heat from the laser light source 3 is radiated from the casing 46, and retention of heat and temperature rise in the casing 46 can be prevented. Further, heat of the laser source 3 is not transmitted to the optical system 1 because the laser beam from the laser light source 3 is guided by the optical fiber 22, or heat is also not transmitted to mechanisms, which support the optical system 1. As a result, it is possible to measure at high accuracy.

Figure 7:
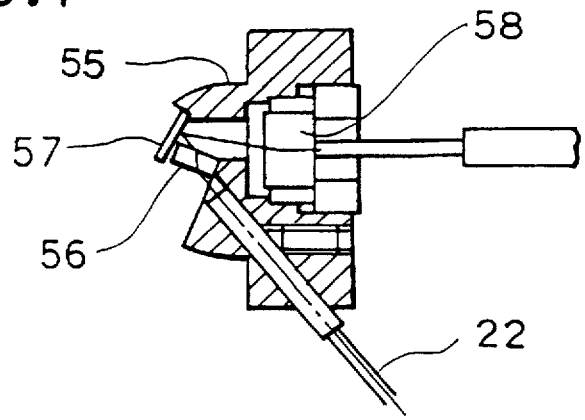
FIG. 7 is an enlarged partial cross-sectional view of a laser beam emitting unit.
Figure 8:
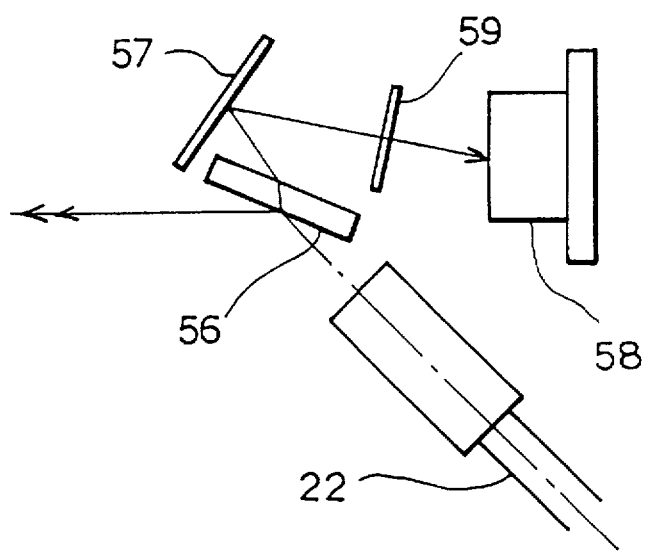
FIG. 8 is a schematical drawing of the laser beam emitting unit.

Next, description will be given on an example of the laser beam emitting unit 42 referring to FIG. 7 and FIG. 8.

An output end of the optical fiber 22 is guided toward the laser beam emitting unit 42, and the output end enters a holder 55 at a suitable angle with respect to the laser beam emitting optical axis. Normally, when a polarized light having a given direction of polarization enters the optical fiber, an emitted light is no more polarized. However, the optical fiber 22 is a constant polarization optical fiber, which sends light while maintaining the direction of polarization. Near the end surface of the optical fiber 22, a polarizing mirror 56 is arranged and on the rear side of the polarizing mirror 56, a mirror 57 is arranged one after another, and a polarizing plate 59 and a photodetector for monitor 58 are arranged to face the mirror 57. Of the laser beams emitted from the output end of the optical fiber 22, a transmitted light passing through the polarizing mirror 56 is reflected by the mirror 57 and is received by the photodetector for monitor 58. A linearly polarized laser beam irradiated from the laser light source is guided by the optical fiber 22 while maintaining the direction of polarization and is irradiated toward the polarizing mirror 56.

The polarizing mirror 56 reflects almost all of the laser beams but allows several % of them to pass as a monitor beam. The laser beam outputted from the optical fiber 22 is S polarized light but it contains some P polarized light. The polarizing mirror 56 allows P polarized light to pass together with several % of S polarized light. Receiving the transmitted polarized light, the mirror 57 reflects it toward the photodetector. The polarizing plate 59 is placed between the mirror 57 and the photodetector 58 and it allows only S polarized light to pass. The emitted laser beam is virtually S polarized light, and S polarized light is monitored. Monitored information is fed back to emission driving of the laser light source 3 to improve recognizability of the laser beam to be emitted and to stabilize an output, and the laser beam to be emitted is further detected.

Figure 9:
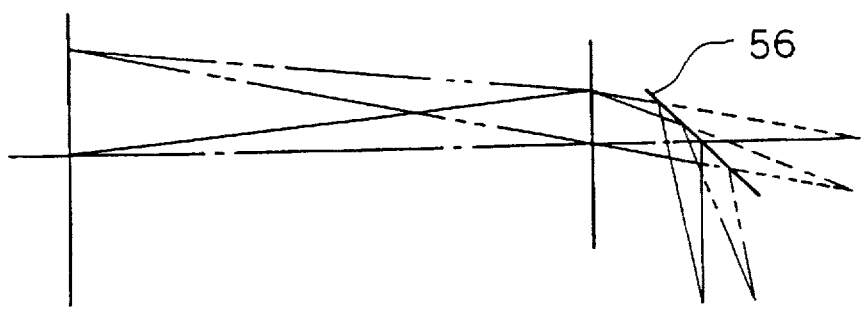
FIG. 9 shows optical paths of the laser beam emitting unit.

FIG. 9 shows an optical path, representing relationship between the polarizing mirror and the arrangement of the light source (light emitting point) L. When a mounting error of the polarizing mirror 56 on optical path is converted to a transfer of the light source L, the transfer of the light source is a transfer of a convergent point with respect to the optical axis. The longer the distance between the light source and the polarizing mirror 56 is, the bigger the transfer of the light source is. To reduce the amount of transfer, it is necessary to decrease the distance between the light source L and the polarizing mirror 56. In case the light source L is not transferred, a transfer of the light source L can be converted to a tilt angle of the polarizing mirror. Therefore, to decrease influence of the mounting error of the polarizing mirror and to converge the laser beams on the optical axis, it is necessary to decrease the distance between the light source L and the polarizing mirror. In the present system, the polarizing mirror is placed near the laser beam emitting end of the optical fiber 22.

In case the laser beam from the light source unit 60 is guided to the optical fiber 22 and the laser beam is outputted from the laser beam emitting end 22b, the problems such as a positional deviation of the condenser lens 17 or the incident fiber end 22a, variations of fiber connecting efficiency due to a rupture of fiber or other causes, a decrease or an increase of a laser output caused by a positional deviation of components of the optical resonator cannot be solved by a feedback control of only the monitor photodetector 62 arranged inside the light source unit 60.

Figure 10:
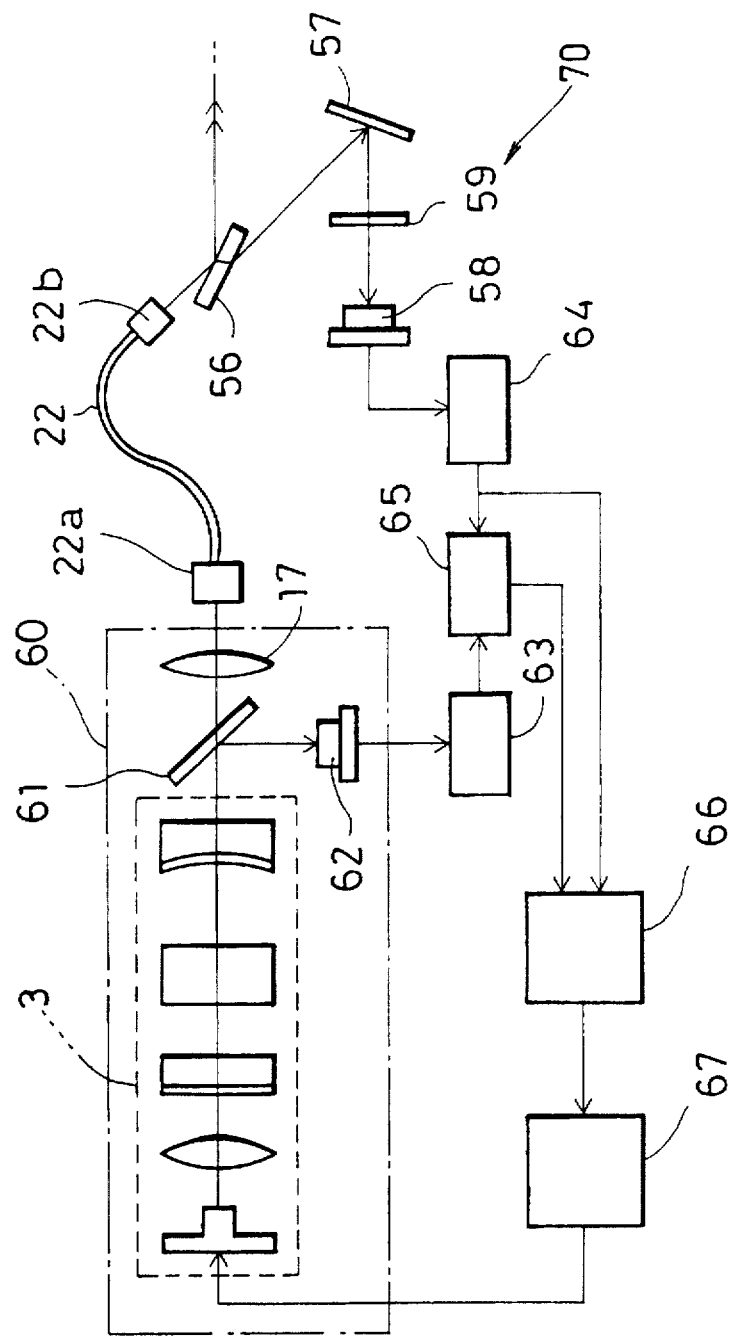
FIG. 10 is a control block diagram of a light source unit according to the present invention.

FIG. 10 is a block diagram of feedback system where a monitor photodetector 70 is arranged on the light source unit 60 and the laser beam emitting end 22b. The light source unit 60 comprises a laser light source 3, a half-mirror 61 and a condenser lens 17. The output of the laser beam from the light source unit 60 is split by a half-mirror 61. The one split is received by a monitor photodetector 62, the other split is guided toward the laser beam emitting end shown in FIG. 7 by the optical fiber 22 and is irradiated.

Being split by the polarizing mirror 56, the monitor beam is reflected by the mirror 57, and after passing through the polarizing plate 59, it enters the monitor photodetector 58. A light receiving signal from the monitor photodetector 58 and a photodetector circuit 64 is inputted to a comparator circuit 65 and a control unit 66.

Light receiving signals from the monitor photodetector 62 and the photodetection circuit 63 of the light source unit 60 are inputted to the comparator circuit 65. Light receiving signals from the photodetection circuits 63 and 64 are compared by the comparator circuit 65, and in case the comparison value is deviated from a predetermined range, electric signal is inputted to the control unit 66. In case the comparison value of the light receiving signals from the photodetection circuits 63 and 64 is within the predetermined range, the light receiving signal from the photodetection circuit 64 is inputted to the control unit 66, and a control signal corresponding to an input signal is outputted to an LD drive unit 67. The LD drive unit 67 controls light emission of the LD light emitter based on the control signal.

Deviation of the comparison value from the predetermined range means that there are a decrease or an increase of a laser output emitted from the fiber caused by a positional deviation of the condenser lens or an incident fiber end, variations of fiber connecting efficiency due to a rupture of fiber or other causes. In such case, the electric signal to warn abnormal sign from the comparator circuit 65 is inputted to the control unit 66 for safety purpose, and the control unit 66 stops the LD drive unit 67 or display abnormality.

It is needless to say that various changes and modifications can be made in the present invention, e.g. the laser light source 3 or the light emitting unit 8 may be provided outside the casing, or that a heat radiating plate may be placed on a mounting portion of the laser light source 3 or the light emitting unit 8 in the casing.

In the present invention, it is possible to use a green laser beam easily recognizable, and a working efficiency can be improved. A heat generating portion of the laser light source unit is thermally separated from the optical system and supporting mechanisms of the optical system, and heat is radiated by utilizing the casing of the laser system for surveying. As a result, it is possible to prevent decrease of accuracy due to heat. Because the laser beam from the heat generating portion is guided by a flexible optical fiber, there is no adverse influence on operations of the optical system.

Next, description will be given on a connection of the laser light source with the optical fiber.

In case the laser beam from the laser light source 3 of internal resonance type SHG oscillator is guided to the laser beam incident end 22a of the optical fiber 22 and further to the optical system 1 by means of the optical fiber 22, high accuracy is required for positioning of the laser beam output unit and the laser beam incident end 22a of the optical fiber 22. Connecting efficiency depends on aberration of the condenser lens, and there is extensive influence by a tilting of the optical fiber and a positional deviation.

When fixing the incident end of the optical fiber 22, it is necessary to adjust the incident end of the optical fiber 22 in vertical and horizontal directions in a plane perpendicular to the laser beam so that the laser beam efficiently enters the optical fiber 22, to adjust to tilt it with respect to the optical axis, or to adjust the direction of the optical axis. Further, in case a direction of polarization of the laser beam is adjusted, it is necessary to adjust a rotating direction around the optical axis.

Figure 11:
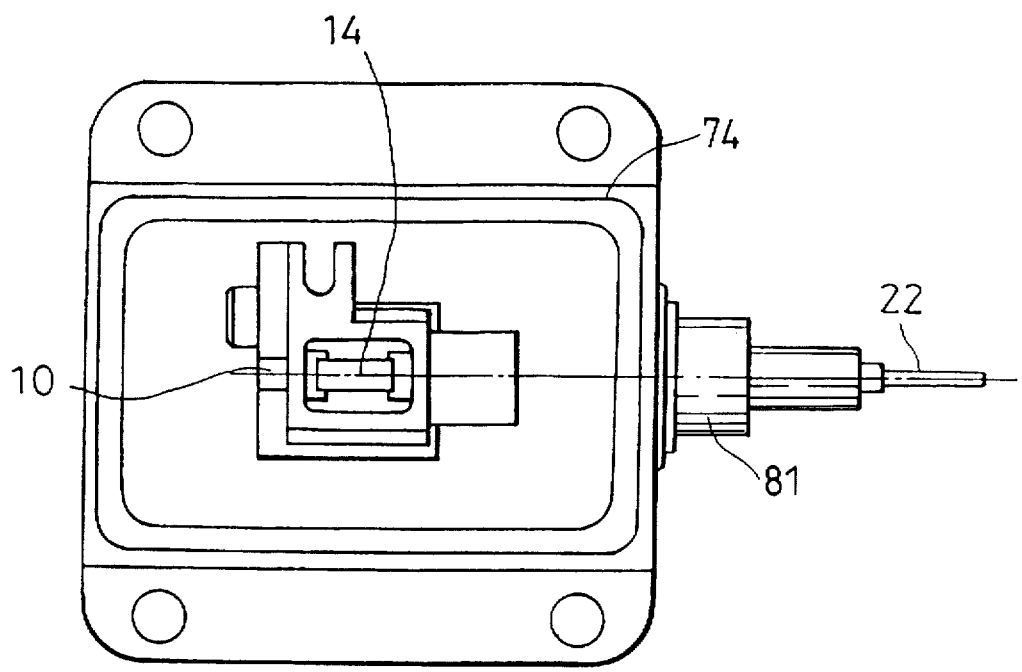
FIG. 11 is a plan view showing a connecting structure of the laser light source and the optical fiber in the present invention.
Figure 12:
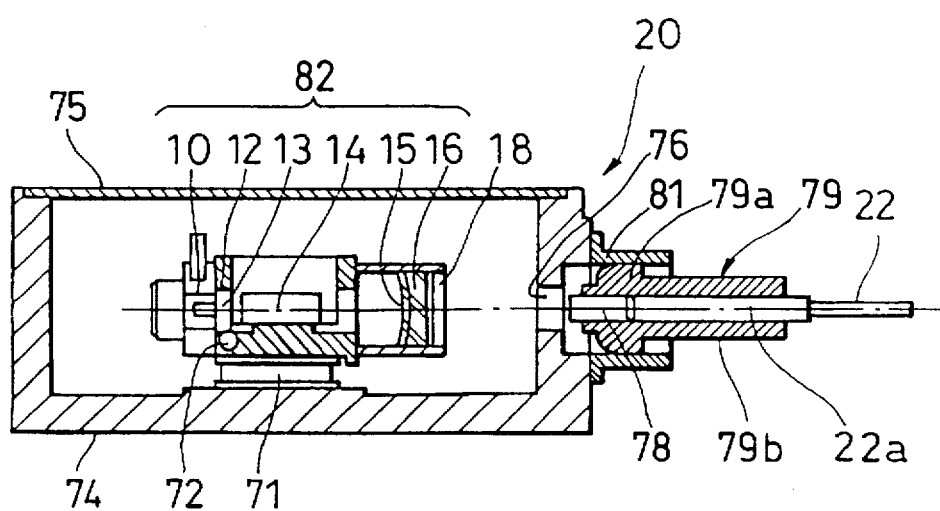
FIG. 12 is a cross-sectional view of the connecting structure.

Description is now given on the procedure to connect the laser light source 3 with the optical fiber 22 referring to FIG. 11 and FIG. 12.

A casing 74 is designed in a somewhat flat rectangular parallelopiped with its top opened, and the upper opening is closed with a lid 75. At the bottom surface of the casing 74, an optical resonator 82 is fixed via an electronic freezing element (TEC) 71. On the optical resonator 82, a thermistor 72 for temperature monitoring is mounted. A detection result by the thermistor 72 is inputted to a controller (not shown), and temperature of the optical resonator 82 is controlled via the electronic freezing element 71. When necessary, a part of the laser beam emitted from the optical resonator 82 is split by light splitting means, and a part of the laser beam is received by a photodetector (not shown). A light receiving signal outputted from the photodetector is fed back to a laser output controller (not shown), and an output of the LD light emitter 10 may be controlled so that intensity of the laser beam emitted by the laser output controller reaches a preset value.

As shown in FIG. 2, the optical resonator 82 comprises an LD light emitter 10, a condenser lens 11 (not shown in FIG. 12), and an output mirror 16 with a second dielectric reflection film 15 formed on it, and these components are arranged along optical axis of the LD light emitter 10. Further, a hot mirror 18 is placed on the side of the output mirror 16 opposite to the LD light emitter 10, and these are integrated. The hot mirror 18 is highly reflective to fundamental wave, i.e. 1064 nm, and is highly transmitting to SHG wave, i.e. 532 nm.

Aligned with the optical axis of the LD light emitter 10, a laser beam emitting hole 76 passing through the casing 74 is formed. On the outer side of the laser beam emitting hole 76, a cylindrical holder 81 is placed in alignment with the optical axis of the LD light emitter 10, and a ball joint 79 is engaged with the holder 81. The holder 81 is movable along the mounting surface of the casing 74, i.e. in a plane perpendicular to the optical axis of the optical resonator 82. With the ball joint 79 retained at the position, a positional adjustment can be performed in a plane perpendicular to the optical axis of the holder 81.

An end of the optical resonator 82 closer to the ball joint 79 is formed in a spherical portion 79a, and the side of the ball joint 79 opposite to the optical resonator 82 is designed in an optical fiber holding unit 79b. The spherical portion 79a is engaged with the holder 81, and the optical fiber holding unit 79b is extended from the holder 81. The laser beam incident end 22a of the optical fiber 22 is engaged with and held by the optical fiber holding unit 79b.

On the side of the ball joint 79 closer to the spherical portion 79a, a GRIN lens (Greated Index lens) 78, serving as a condenser lens, is placed, and the GRIN lens 78 is designed in such manner that laser beams emitted from the optical resonator 82 are focused on the end surface of the optical fiber 22.

The spherical portion 79a is properly engaged with and held by the holder 81. By applying a force higher than a preset value on the ball joint 79, it is possible to rotate it by tilting with respect to optical axis, to twist around the axial center, and to move it in an axial direction. With the optical fiber 22 held at the position, the ball joint 79 can be adjusted in rotating in a direction tilted with respect to optical axis around the center of end surface of the laser beam incident end 22a, in twisting direction around the optical axis, or in positioning in the direction of the optical axis.

As described above, a connecting condition of the optical resonator 82 and the laser beam incident end 22a exerts influence on incident efficiency of the laser beam from the optical resonator 82 toward the laser beam incident end 22a. Therefore, the holder 81 is moved with respect to the casing 74, and the ball joint 79 is rotated, twisted and adjusted in position with respect to the holder 81. Further, an adjustment of the optical axis of the optical resonator 82 and the optical fiber 22, an alignment of plane of polarization of the optical fiber 22 with the laser beam emitted from the optical resonator 82, and an alignment of focusing position of the laser beam with the end surface of the optical fiber 22 are performed. Thus, it is possible to maximize incident efficiency of the laser beam emitted from the optical resonator 82 to the optical fiber 22.

After the final adjustment has been completed, the holder 81 and the ball joint 79 are fixed using adhesive agent. Because the holder 81 and the ball joint 79 are engaged with each other, intrusion of the adhesive agent is prevented, and no contamination occurs on an end surface of the fiber.

Figure 13:
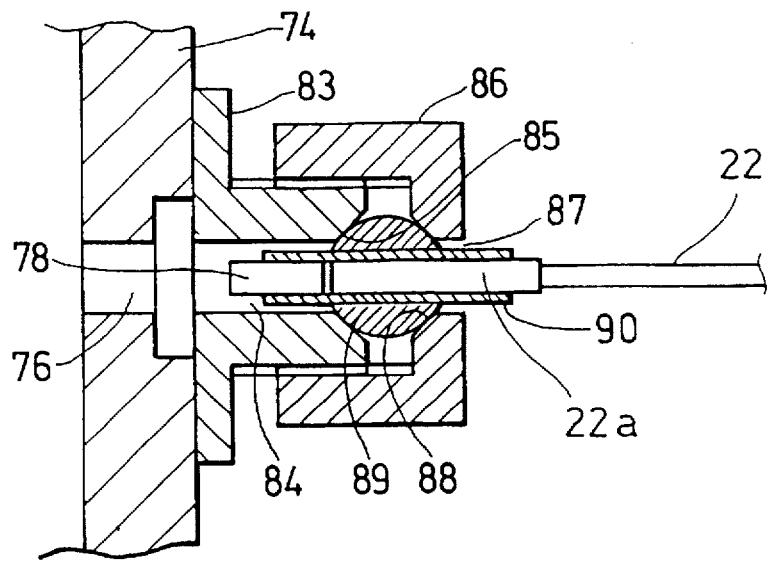
FIG. 13 is a cross-sectional view of another connecting structure of the laser light source and the optical fiber in the present invention.

Next, description will be given on another embodiment of the invention referring to FIG. 13. In the figure, the same component as shown in FIG. 12 is referred by the same symbol.

A holder 83 with a through-hole 84 formed in it is fixed on the casing 74 in such manner that the laser beam emitting hole 76 is concentric. On the forward end of the through-hole 84, a tapered portion 85 is formed, and a cap nut 86 is engaged on the holder 83. The holder 83 is movable along the mounting surface of the casing 74, and its position can be adjusted in two directions perpendicular to the optical axis. In the cap nut 86, a hole 87 concentric to the through-hole 84 is formed, and a tapered portion 88 opposite to the tapered portion 85 is formed on inner surface of the hole 87. Between the holder 83 and the cap nut 86, a spherical ball joint 89 in contact with the tapered portions 85 and 88 is squeezed. A holder tube 90, where the laser beam incident end 22a is inserted and a GRIN lens 78 is placed at the forward end, penetrates the ball joint 89. The holder tube is slidable in the direction of the optical axis with respect to the ball joint 89.

By loosening the cap nut 86, the ball joint 89 can be rotated. Adjustments of rotation, twisting and position of the laser beam incident end 22a, adjustment of the optical axis of the optical fiber 22 with that of the optical resonator 82, alignment of a plane of polarization of the optical fiber 22 with the laser beam emitted from the optical resonator 82, and alignment of focusing the position of the laser beam with the end surface of the optical fiber are performed.

After the final adjustment has been completed, the holder 83 is fixed, and the cap nut 86 is tightened. Further, the holder 83 and the ball joint 89 are fixed using adhesive agent. A slit is formed in the ball joint 89, and by tightening the cap nut 86, the ball joint 89 is reduced. Or, by tightening the cap nut 86, a fixing of the laser beam incident end 22a to the ball joint 89 may be carried out at the same time.

Therefore, it is possible according to the present invention to adjust rotation, twisting and positioning of the optical fiber in assembled condition when connecting the optical fiber with the laser light source. Thus, there is no need to demand high accuracy on each component. Also, it is possible to improve working efficiency and to increase connecting accuracy and to connect at high efficiency because no fine or delicate adjusting is required in the adjustment process.

What we claim are:

1. A laser system for surveying, comprising a laser light source unit, an optical system for irradiating a laser beam toward a given direction, and an optical fiber for guiding the laser beam toward the optical system, wherein the laser light source unit is an LD pumped solid-state laser comprising a light emitting unit and an optical resonator, and said optical resonator is provided in said optical system, and said optical fiber guides the laser beam from said light emitting unit toward said optical resonator so that said light emitting unit is thermally isolated from said optical system.

2. A laser system for surveying according to claim 1, wherein said light emitting unit is fixed on a casing, and heat is radiated via said casing.

3. A laser system for surveying, comprising a laser light source unit, an optical system for irradiating a laser beam toward a given direction, and an optical fiber for guiding the laser beam toward the optical system, wherein the laser light source unit is an LD pumped solid-state laser comprising a light emitting unit and an optical resonator, and said optical fiber guides the laser beam from said laser light source unit toward said optical system so that said laser light source unit is thermally insulated from said optical system.

4. A laser system for surveying according to claim 3, wherein said laser light source unit is fixed on a casing, and heat is radiated via said casing.

5. A laser system for surveying according to claim 1, wherein said light emitting unit is fixed on a heat sink, and heat is radiated by said heat sink.

6. A laser system for surveying according to claim 3, wherein said light emitting unit is fixed on a heat sink, and heat is radiated by said heat sink.

7. A laser system for surveying according to claims 2 or 4, wherein said laser light source unit is fixed on said casing via an electronic freezing element.

8. A laser system for surveying according to claims 5 or 6, wherein said laser light source unit is fixed on said heat sink via an electronic freezing element.

9. A laser system for surveying according to claims 2 or 4, wherein a portion of said casing on which said laser light source unit is fixed consists of high heat conductive material.

10. A laser system for surveying according to claim 9, wherein a portion of said casing on which said laser light source unit is fixed consists of plastic including carbon.

11. A laser system for surveying according to claim 9, wherein a portion of said casing on which said laser light source unit is fixed consists of metal.

12. A laser system for surveying according to claims 5 or 6, wherein said heat sink upon which said laser light source is fixed consists of high heat conductive material.

13. A laser system for surveying according to claim 12, wherein said heat sink consists of metal.

14. A laser system for surveying according to claims 1 or 3, wherein said optical fiber is a constant polarization optical fiber, sending a light while maintaining a direction of polarization.

15. A laser system for surveying according to claims 1 or 3, wherein said laser beam is a high visible green laser beam.

* * * * *